UNITED STATES PATENT OFFICE.

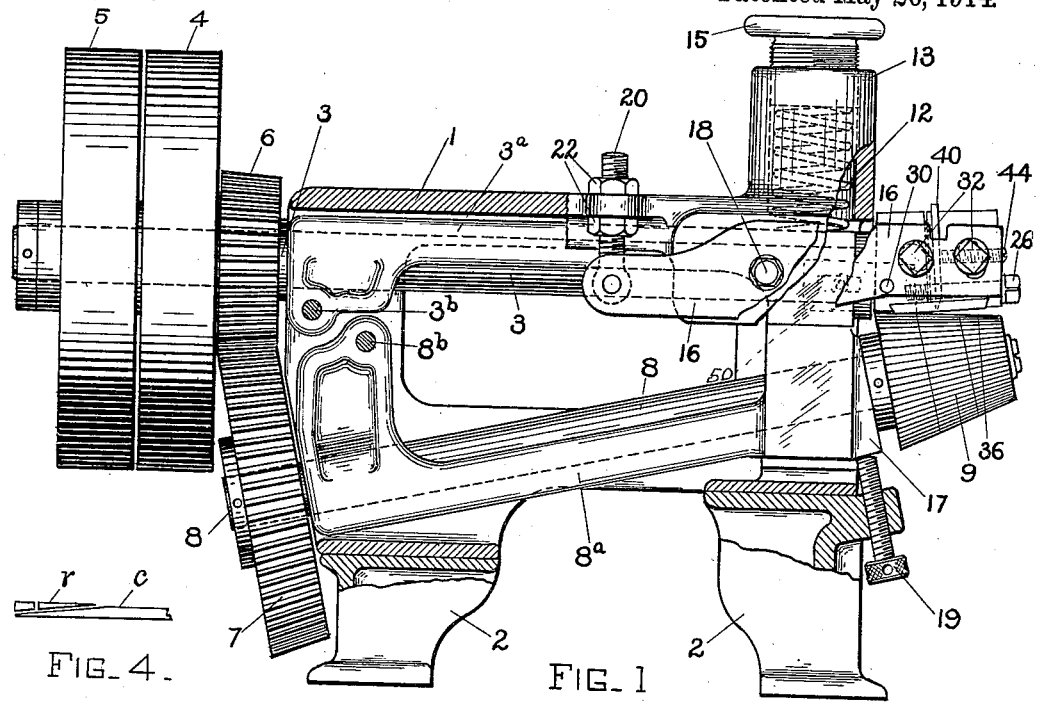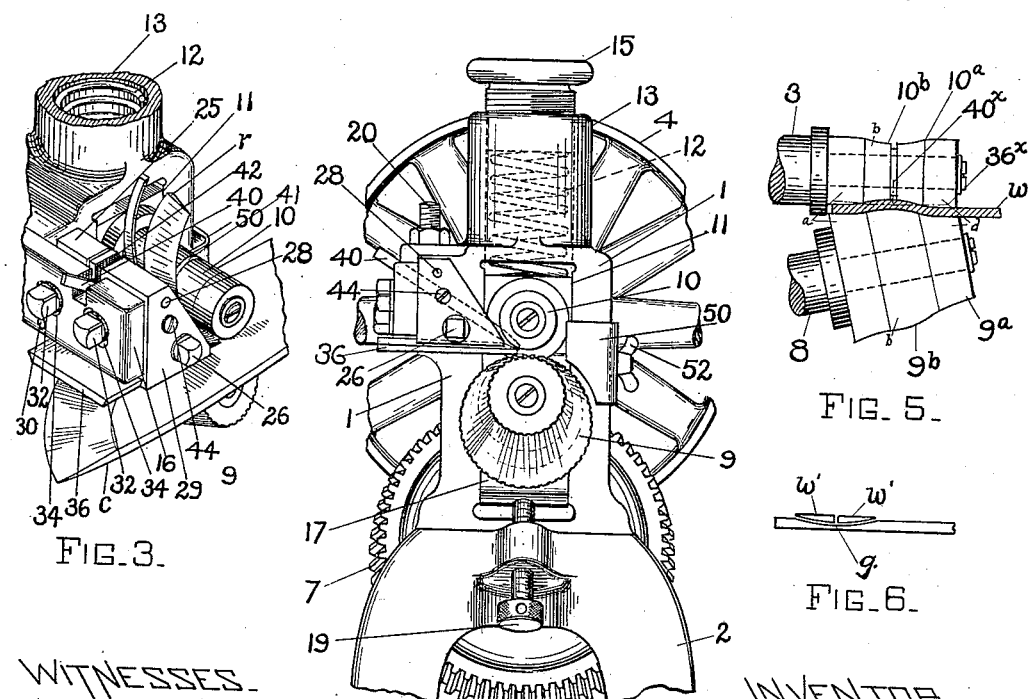

ELIZABETH M. FITZGERALD, OF BOSTON, MASSACHUSETTS, ADMINISTRATRIX OF WALTER SCOTT FITZGERALD, DECEASED, ASSIGNOR TO UNITED SHOE MACHINERY COMPANY, OF PATERSON, NEW JERSEY, A CORPORATION OF NEW JERSEY.

SKIVING-MACHINE.

1,098,240.　　　　　Specification of Letters Patent.　　Patented May 26, 1914.

Application filed January 23, 1903. Serial No. 140,319.

*To all whom it may concern:*

Be it known that WALTER S. FITZGERALD, late of Boston, in the county of Suffolk and State of Massachusetts, now deceased, invented an Improvement in Skiving-Machines, of which the following description, in connection with the accompanying drawings, is a specification, like reference characters on the drawings indicating like parts in the several figures.

This invention relates to leather working machines and it is herein illustrated as applied to machines which are designed particularly for skiving counters or heel stiffeners or for removing strips from stock and for utilizing the strip removed from the counter or piece of stock by converting this strip into a rand such as is customarily applied to the heel-seat of a shoe.

One feature of the invention consists in an improved work feeding mechanism which is so constructed and arranged as to insure that the work will be fed with its edge always in contact with the usual edge guide. This feeding mechanism is particularly useful for feeding pieces of work the edges of which are curved. Such pieces of work usually have to be manually guided in order to keep the curved edge against the edge guide. The feeding mechanism of the present invention is constructed to cause the work to be drawn automatically toward the edge guide as it is being fed to the cutter, and therefore the edge of the work is kept constantly against the edge guide, even when the rounded edges at the end portions of a piece of work, such as a counter, are being skived.

Another feature of the invention consists in an improved knife-carrying mechanism by means of which the cutting knife may be readily and accurately adjusted to vary its relation to the work and thereby change the cut formed in the work. As herein shown, the knife-carrying mechanism has provision for adjustment of the knife about two centers, and these centers are so located that by adjusting the knife about one of them the angle of the cut is changed, but its depth is not materially altered; and by adjusting the knife about the other center the depth of the cut is varied, but its angle remains substantially unchanged.

Another feature of the invention consists in providing, in combination with the main cutting blade, a knife for acting upon the strip of material removed from the work by the main knife to convert this strip of material into an article of manufacture, such as a rand. The strip of material trimmed off from the work by the machine has usually been considered as a waste product, but by means of the present improvement in this class of machines this strip is converted into a rand at the same time that it is removed from the body of the work. This is done by the automatic operation of the machine during the skiving or cutting operation without any additional expense whatever.

Figure 1 is a side elevation of the machine, parts of the framework being broken away for better disclosing the mechanism. Fig. 2 is a front elevation of the machine shown in Fig. 1. Fig. 3 is a perspective view of a portion of the head of the machine and shows a piece of work in position in the machine and partially skived. Fig. 4 is an end view of a piece of work showing the lines on which it has been cut by the skiving and rand-forming knives. Fig. 5 is a view of a modified form of feeding rollers with which the machine may be provided to adapt it for use in cutting a groove in the work instead of skiving the edge of the work. Fig. 6 is an end view of a piece of work acted upon by a machine equipped with the feeding rollers shown in Fig. 5.

The framework of the machine, indicated at 1, is mounted on suitable legs 2.

3 indicates a driving shaft to which are applied fast and loose pulleys 4 and 5, and also a bevel gear 6 which meshes with a gear 7 mounted on a shaft 8 which extends obliquely with relation to the shaft 3. The shafts 3 and 8 are provided with feeding rollers 9 and 10. The lower roller 9, carried by the inclined shaft 8, is in the form of a truncated cone of such shape that the portion of its face adjacent to the upper feeding roller 10 is substantially parallel with the face of the roller 10 so that the work being fed is engaged with equal pressure by said rollers throughout their length. The shaft 3 is mounted in bearings in a shaft-carrying bracket 3ª which is pivoted to the frame of the machine at 3ᵇ, and its front end is guided in a recess 11 in the frame. The front end portion of the bracket 3ᵃ is pressed upon by a spring 12 contained within a hollow dome 13 formed on the frame. The pressure of the spring 12 is regulated by an adjusting nut 15, as clearly shown in Fig. 1. The spring 12 causes the feeding roller 10 to bear with a yielding pressure upon the work being fed and permits said feeding roller 10 to yield upwardly to accommodate the inequalities or variations in the thickness of the work being fed. The shaft 8 which carries the lower feeding roller 9 is mounted in a shaft-carrying bracket 8ᵃ which is pivoted to the frame of the machine at 8ᵇ. The front end of the bracket is received in a guideway in the front portion of the frame of the machine, and has a shoulder or projection 17 which rests upon a screw 19 by means of which the shaft-carrying bracket may be vertically adjusted to position the lower feeding roller 9 in desired relation to the upper feeding roller 10 according to the thickness of the stock to be operated upon.

The tapering or conical form of the lower feeding roller 9 tends to move the edge portion of the work faster than the portion remote from the edge and thereby causes the work to be guided against the usual edge guide which is indicated at 50 in Figs. 2 and 3. By this construction a piece of work, even though its edge be curved or rounded, will be fed with its edge at all times against the edge guide and does not require to be manually guided to keep it against the edge guide. This relieves the operator and insures more uniform skiving than results when curved work is manually controlled to keep it against the edge guide.

A knife-carrying lever 16 is pivoted at 18 to the frame of the machine and its rear end is connected by an adjusting bolt 20 to the frame and is secured in adjusted position by locking nuts 22, 22. A knife support which is attached to the lever 16 comprises two blocks 25 and 29 which are connected by a pin 28 and a screw bolt 26. The knife support is secured to said knife-carrying lever 16 by means of a pivot pin 30 and clamping bolts 32, 32. The clamping bolts 32, 32 extend through slots 34, 34 into the blocks 25 and 29, said slots permitting the adjustment of the knife support about its pivotal connection 30 with the knife-carrying lever 16. The skiving knife 36 is received between depending flanges of the blocks 25 and 29 of the knife support and is secured in adjusted position by the clamping bolt 26, as shown in Figs. 1 and 3.

The skiving knife may be adjusted to vary its angular relation to the work presented to it by the feeding rollers, and thereby to determine the angle of the bevel formed on the work, by adjusting the knife support about its pivotal connection 30 with the knife-carrying lever 16. This pivotal connection between the knife support and the lever 16 is located near the inner edge of the skiving knife, so that in the adjustment of the knife about this pivot the inner edge of the knife will not be raised or lowered enough to alter materially its vertical relation to the feeding rollers. By this arrangement the angle of the bevel may be varied without materially changing the depth of the skiving cut. By adjusting the knife-carrying lever 16 about is pivotal connection at 18 with the frame the depth of the skiving cut may be varied without substantially affecting the angle of the bevel formed thereby.

The block 29 of the knife support is slotted at 42 to receive a knife 40 which is adjustably clamped in the slot 42 by the screw 44, shown in Figs. 1 and 3. The knife 40 extends into the path of the strip which is removed from the work by the skiving knife 36 and serves to divide said strip or trim off a portion of it in order to form from said strip a rand such as indicated at $r$ in Figs. 3 and 4. The edge guide 50 may be adjusted with relation to the rand-forming knife 40 to provide for trimming the strip to the right width to form of it the rand $r$. The edge guide is secured in adjusted position by the clamping nut 52.

For the purpose of enabling the knife 40 to act on the work to the best advantage and insuring that it shall entirely sever the strip which is trimmed off from the rand said knife is preferably located with one end of its cutting edge in contact with the skiving knife near the inner edge of the latter, as shown clearly in Fig. 2, and the upper feeding roller 10 is provided with a groove 41 in which is received the upper end or corner of the edge of the trimming knife. By means of this arrangement the strip of material removed by the skiving knife is acted upon by the trimming knife immediately after it is severed from the body of the work and while it is still held between the two feeding rollers or between the upper feeding roller and the upper face of the skiving knife. This insures that the rand will be trimmed with exactness.

In the modification shown in Fig. 5 the work feeding rollers are adapted to bend the work as it is presented to the knife in order to cause a piece to be cut from the face of the work thereby to form a groove in the face of the work, as shown at $g$ in Fig. 6. For this purpose one of the feeding rollers, preferably the upper roller, is provided with a groove, as indicated at 10ᵇ, and the lower roller is provided with a ridge, as indicated at 9ᵇ. The ridge and the groove coöperate to bend the work out of a straight line and cause the bent-up portion to be presented against the knife 36 as the work is fed between the rollers. The knife removes the bent-up portion from the face of the work, as indicated in Fig. 6, and the trimming knife 40 divides the part which is removed by the knife 36 into two rands, as indicated at $w'$, $w'$ in Fig. 6. When the rollers $9^a$ and $10^a$ are employed the knife 36 preferably is positioned with its cutting edge parallel with the axis of rotation of the feeding roller $10^a$, as indicated by the broken line $36^x$ in Fig. 5. $40^x$ indicates the position of the trimming knife. Differently formed feeding rollers may be substituted for the rollers $9^a$ and $10^a$ to cause any desired arrangeemnt of grooves or recesses to be cut into the face of the work by the knife 36. For instance, rollers having a series of grooves and ridges, the grooves and ridges of the series being of the same or different width, might be employed, or rollers in which the grooves and ridges were not continuous might be employed for the purpose of causing a series of recesses to be formed in the face of the work.

The feeding rollers may be formed in sections or rings as indicated at $a$, $b$, $d$, in Fig. 5. Any one of these sections may be removed and replaced by another one having a different surface conformation.

In the operation of the machine a piece of work to be skived, such as a counter $c$, is inserted between the feeding rollers and by them forced against the skiving knife 36 by which its edge is skived or beveled, as shown in Figs. 3 and 4. The portion removed from the body of the counter by the skiving knife meets the trimming knife 40 immediately after it is severed and while it is still clamped between the feeding rollers or between the upper feeding roller and the knife 36, so that it is prevented from buckling as it is acted upon by the trimming knife. The knife 40 trims the strip to the desired width to form from it a rand $r$, as shown in Figs. 3 and 4. It will be noticed that the adjacent faces of the feeding rollers are parallel, so that the work is acted upon by them with equal pressure throughout the length of their acting faces, and the conical formation of the lower feeding roller causes the work to hug the edge gage as it is fed, so that if the work has a curved edge, such, for example, as the upper curved edge of a counter, it is automatically turned and guided as it is fed, thereby to keep said curved edge against the edge guide without any manipulation on the part of the workman. This arrangement of a conical feeding roller on a shaft at an angle to the shaft on which the coöperating feeding roller is mounted, whereby the adjacent faces of the feeding rollers are parallel and the conical roller causes the work to hug the edge guide and automatically turns the work to keep its curved edge against said edge guide, is an important feature of this invention.

When it is desired to form grooves or recesses in work grooved and ridged feeding rollers will be substituted for the plane rollers 9 and 10, and, preferably, the knife support then will be adjusted about its pivotal connection with the knife-carrying lever 16 to arrange the edge of the knife 36 parallel with the axis of the upper feeding rollers. as shown in Fig. 5. Then when the work is fed between said rollers a portion of it is bent up to meet the knife 36 and is removed to form, when the work is allowed to resume its normal condition after passing the feeding rollers, a groove or channel or a recess in the face of the work. The strip which is removed to form the groove in the face of the work is acted upon by the knife 40 and divided to form two rands $w'$ and $w'$, as indicated in Fig. 6.

Having thus fully described my invention, I claim as new and desire to secure by Letters Patent in the United States:—

1. A machine of the class described having, in combination, a cutter arranged for adjustment to operate at different angles, two shafts, pivoted bearings in which said shafts are mounted, means for adjusting one bearing about its pivot toward the other, a tapering roller mounted upon one shaft, a coöperating roller mounted on the other shaft and an edge gage against which the work is guided.

2. In a machine of the class described, the combination with work-feeding mechanism, of a knife to cut a strip from the work being fed, a knife having its cutting edge extending at an angle to the edge of the first knife for shaping said strip, a lever on which the two knives are carried, means for adjusting the lever to raise or lower the knives, and means permitting relative adjustment of said knives and the lever in a direction to vary the angular relation of the shaping knife to the work.

3. In a machine of the class described, the combination with work-feeding mechanism, of a lever, a knife block secured to the lever, a knife supported in the knife block for cutting a strip from stock being fed, a second knife for dividing said strip, means for adjusting the lever to vary the vertical relation of the knives to the work being fed, and independent means permitting adjustment of said knife block to vary the angular relation of the knives to the work.

4. In a machine of the class described, the combination with work-feeding mechanism including a yielding pressure roller of a knife arranged to cut a strip from the body of a piece of work being fed and a trimming knife arranged between the first knife and the pressure roller to act on the strip while it is still clamped by the said parts, whereby buckling of the strip is avoided.

5. In a machine of the class described, the combination with work-feeding mechanism comprising a pressure roller, of a knife arranged to cut a strip from the body of the work as it passes under the pressure roller, and a trimming knife arranged between said first knife and the pressure roller, with its cutting edge directly over the cutting edge of the first knife for acting on the strip as it is detached from the body of the work, whereby buckling of the strip is avoided.

6. In a machine of the class described, the combination with a cutting blade of work-feeding mechanism comprising two members having coöperating protuberances and depressions to bend a portion of the work out of the plane of the body thereof and arranged to present the work so bent to the cutting blade whereby the bent-up portions are cut off and recesses are formed in the face of the work, and a trimming knife arranged adjacent the cutting blade to shape the cut off portions into desired form.

7. In a machine of the class described the combination with a cutting blade, of work-feeding mechanism comprising two opposed rollers having coöperating protuberances and depressions formed to bend a portion of the work out of the plane of the body thereof and arranged to present the work so bent to the cutting blade whereby the bent-up portion is cut off and a groove formed in the face of the work, an edge gage adapted to locate said groove adjacent and parallel to the margin of the work, and means for adjusting said edge gage to vary the distance between said groove and said margin.

8. In a machine of the class described, the combination with a cutting blade of work-feeding mechanism comprising two members having coöperating grooves and ridges to bend the work and present it to the cutting blade with a rib projecting above the edge of the blade in position to be removed by the blade, whereby a channel is formed in the face of the work, and a trimming knife to divide the strip and form therefrom a rand or rands.

9. In a machine of the class described, the combination with a cutting blade of work-feeding mechanism comprising two members having coöperating grooves and ridges to bend the work and present it to the cutting blade with a rib projecting above the edge of the blade in position to be removed by the blade, whereby a channel is formed in the face of the work, and a trimming knife to divide the strip as it is removed from the body of the work by the cutting blade and form therefrom a rand or rands, said grooved feeding member having an annular slot to permit the trimming knife to trim the strip while the latter is still acted upon by said feeding member.

In testimony whereof I have signed my name to this specification in the presence of two subscribing witnesses.

ELIZABETH M. FITZGERALD,
*Administratrix of the estate of Walter Scott Fitzgerald, deceased.*

Witnesses:
NELSON W. HOWARD,
ARTHUR L. RUSSELL.

---

Copies of this patent may be obtained for five cents each, by addressing the "Commissioner of Patents, Washington, D. C."